(12) United States Patent
Johnson

(10) Patent No.: US 6,304,053 B1
(45) Date of Patent: Oct. 16, 2001

(54) AUTOMATIC FIRING CHANGE WHEN MOTOR LEADS SWAP ON DELTA MOTOR SOFT STARTER

(75) Inventor: Lynn Stewart Johnson, Aurora, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/604,848

(22) Filed: Jun. 28, 2000

(51) Int. Cl.[7] .................................. H02P 1/26; H02P 1/32
(52) U.S. Cl. ......................... 318/771; 318/434; 318/773; 361/23
(58) Field of Search ..................................... 318/434, 771, 318/773; 388/917, 903; 361/23, 24, 30, 31, 33

(56) References Cited

U.S. PATENT DOCUMENTS

| | | | | |
|---|---|---|---|---|
| 5,227,703 | * | 7/1993 | Boothe et al. | 318/434 |
| 5,243,243 | * | 9/1993 | Andrews | 361/23 |
| 5,761,018 | * | 6/1998 | Blakely | 361/23 |
| 5,859,514 | * | 1/1999 | Chouffier et al. | 318/434 |
| 6,038,114 | * | 3/2000 | Johnson | 361/23 |
| 6,072,674 | * | 6/2000 | Johnson | 361/23 |
| 6,169,383 | * | 1/2001 | Johnson | 318/771 |

* cited by examiner

Primary Examiner—Marlon T. Fletcher

(57) ABSTRACT

Problems associated with delta motors and motor controllers being subjected to swapped lead conditions as well as with time consuming troubleshooting are eliminated in a motor controller that automatically changes firing circuit timing for proper operation of the delta motor when it detects swapped lead condition that occurs during the installation process.

14 Claims, 5 Drawing Sheets

AUTOMATIC FIRING CHANGE WHEN MOTOR LEADS SWAP ON DELTA MOTOR SOFT STARTER

FIELD OF THE INVENTION

This invention relates to motor controllers and more particularly, to a delta motor soft starter that automatically detects when delta motor leads have been swapped and changes firing circuit timing.

BACKGROUND OF THE INVENTION

A delta motor system typically includes a delta motor, a three phase power source, a fault contactor and a motor controller. The motor controller generally includes a set of three control switches that are connected between the line voltage terminals of the three phase power source and the windings of the delta motor. The motor controller regulates the voltage from the three phase power source to the delta motor by selectively opening and closing the three control switches. The proper operation of the delta motor is dependent on the proper regulation of the control switches.

During start up, the controller, also referred to as a soft starter, controls the switches to provide reduced voltage starting until the motor reaches full speed. The motor controller's internal timing mechanisms are specifically designed to regulate the application of specific line voltages from the three phase power source to specific delta motor windings based on a predesignated wiring configuration. Conventional electrical leads are typically used to connect the delta motor windings to the control switches and to the fault contacts. Since the electrical leads providing connection to the delta motor terminals are not always clearly marked, mistakes in wiring the delta motor system are common. If the winding leads are swapped, resulting in the windings being driven relative to different power source phases than required, then the soft starter may not be able to supply a reduced voltage start or may not be able to supply full voltage to the motor after starting. This can also damage the motor and the soft starter.

The present invention is directed to solving one or more of the problems discussed above, in a novel and simple manner.

SUMMARY OF THE INVENTION

It is a principal object of this invention to provide a new and improved motor controller that automatically detects when a delta motor is wired with swapped leads within a motor system. More specifically, it is an object of the invention to provide a motor controller that detects the swapped leads prior to starting the delta motor so that the firing circuit timing can be changed and the delta motor and the motor controller are not subjected to potentially damaging conditions.

An exemplary embodiment of the invention achieves the foregoing objects in a motor controller for use in a motor system including a multiphase power source having three supply lines and a delta motor having three windings.

The motor controller includes a plurality of switching means and a power source detecting means. Each of the switching means is intended to be operatively connected in series with a selected one of the windings and between an associated selected pair of the supply lines. The power source detecting means is operatively connected across each of the switching means to detect if the windings are connected in series with the intended switching means. A control automatically controls the switching of the switching means dependent on whether the windings are connected in series with wherein firing circuit timing of the switch is changed dependent on whether each switch is connected to the first lead of the intended winding or the second lead of the different winding intended switching means.

In one embodiment, the plurality of switching means comprise solid state devices.

In another embodiment, the plurality of switching means comprise SCRs or triacs.

In another form of the invention, the power source detecting means includes a decoding means for detecting the swapped lead condition if the of voltages across each switching means is equal to voltage between an unintended pair of the supply lines.

Other objects and advantages of the invention will become apparent from the following specification taken in conjunction with the accompanying drawings.

DETAILED DESCRIPTION OF THE DRAWINGS

Figure 1:
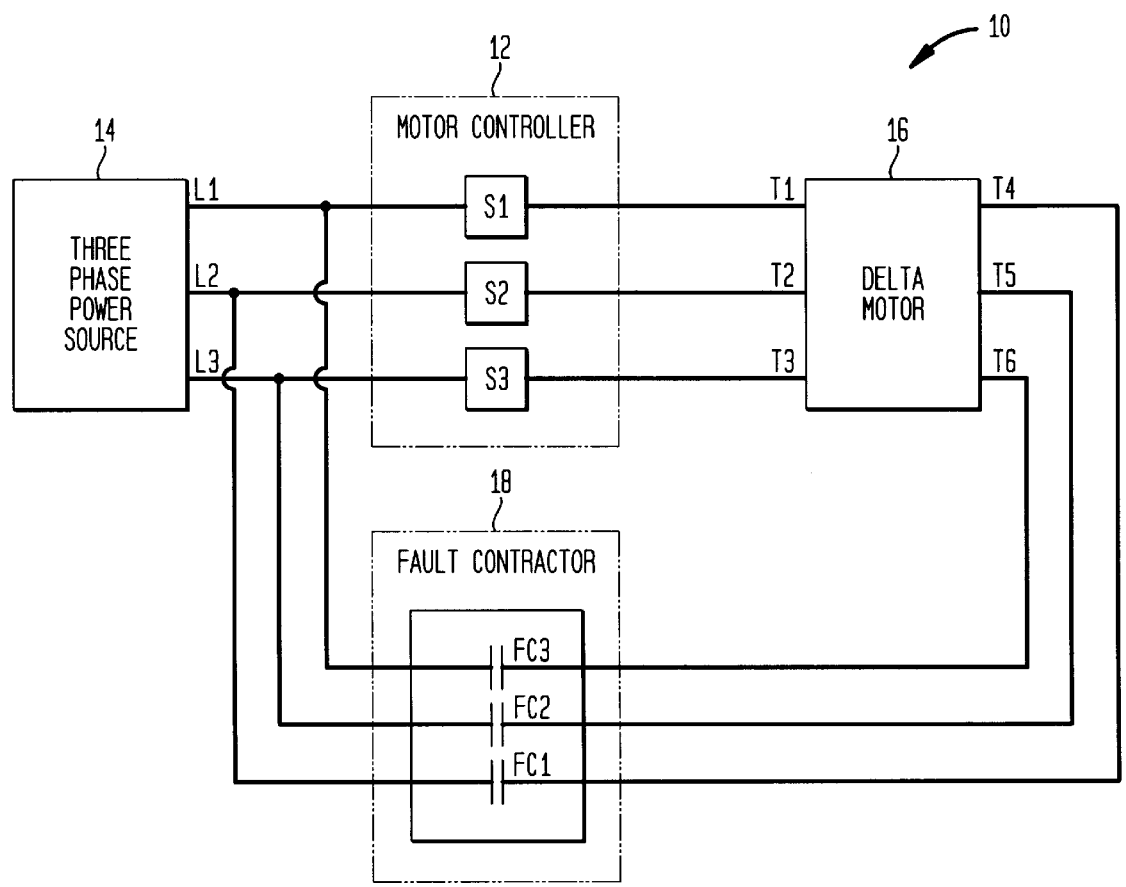
FIG. 1 shows a delta motor system including a motor controller in accordance with the invention.

A block diagram of a delta motor system 10 including a motor controller 12, also referred to as a soft starter, is depicted in FIG. 1. The delta motor system 10 typically consists of a three phase power source 14, a delta motor 16, a fault contactor 18 and the motor controller 12. The motor controller 12 generally includes a set of three control switches S1, S2, S3 for providing electrical connection between line voltage terminals L1, L2, L3 of the three phase power source 14 and respective motor terminals T1, T2, T3 of the delta motor 16. The motor controller 12 regulates the voltage applied to the delta motor 16 by selectively opening and closing the three control switches S1, S2, S3. The proper operation of the delta motor 16 is dependent upon the proper regulation of the control switches S1, S2, S3.

The fault contactor 18 also includes a set of three contacts FC1, FC2, FC3 that are pre-connected between the line voltage terminals L1, L2, L3 and opposite terminals T4, T5, T6 of the delta motor 16 in a preferred embodiment, as shown in FIG. 1. Alternatively, the fault contactor 18 may be connected between the line voltage terminals L1, L2, L3 and the controller 12, as is known. The fault contactor 18 is used to disconnect the three phase power source 14 from the delta motor 16 in the event that the delta motor system 10 experiences a malfunction.

Figure 2:
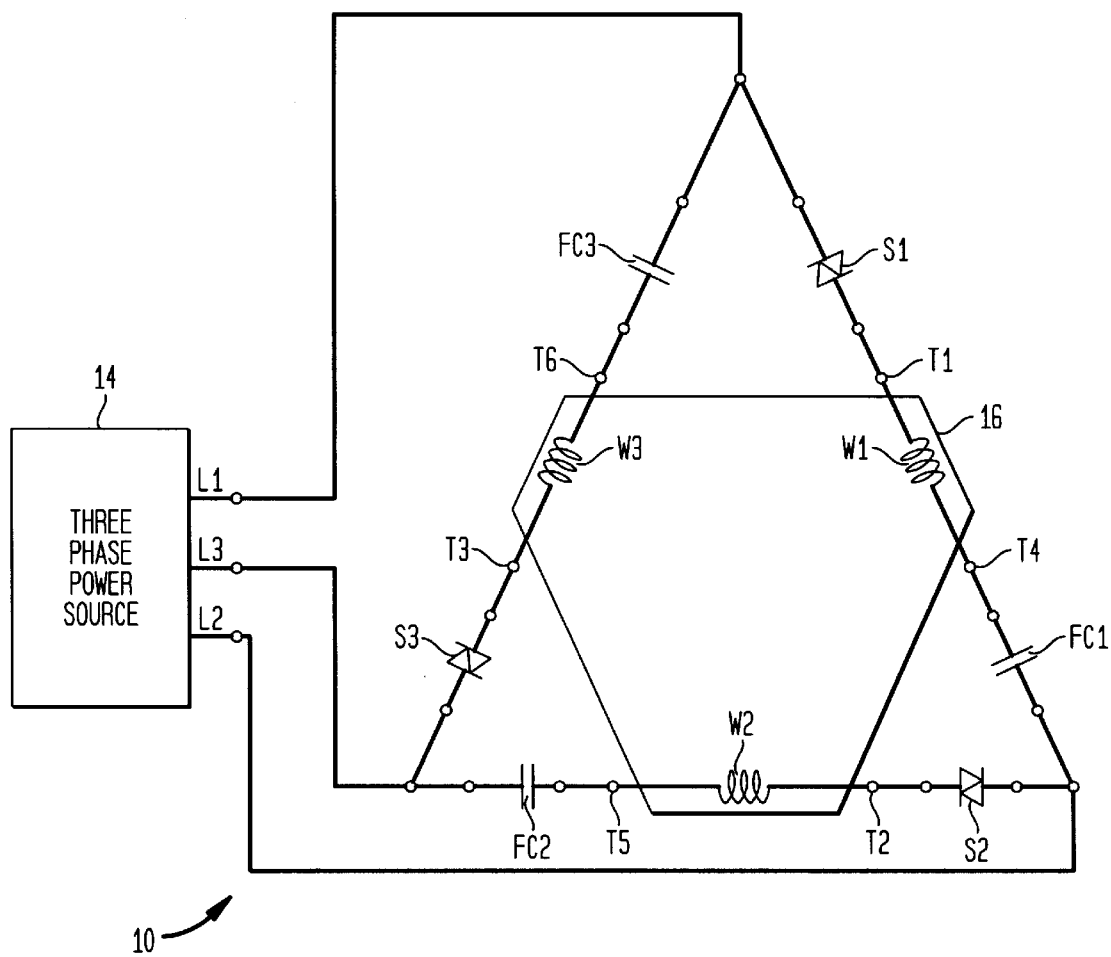
FIG. 2 illustrates the relationships between the delta motor windings, the motor controller control switches and the fault contactor contacts necessary for intended motor controller operation.

FIG. 2 illustrates in detail the necessary relationships between delta motor windings W1, W2, W3, the line voltage terminals L1, L2, L3, the fault contacts FC1, FC2, FC3 and the motor controller control switches S1, S2, S3 for proper motor controller operation with the preferred embodiment. The motor controller's internal timing mechanisms are specifically designed to regulate the application of the three phase voltage from the three phase power source 14 to the delta motor windings W1, W2, W3 based on a predesignated wiring configuration.

The delta motor 16 consists of three windings W1, W2, W3 arranged in a delta configuration. Each winding W1, W2, W3 has a pair of associated motor terminals T1 and T4, T2 and T5, T3 and T6, respectively, that provide electrical connection to either side of each individual winding W1, W2, W3. Terminals T1, T2 and T3 are designated for connection to line voltage terminals L1, L2 and L3, respectively, using the control switches S1, S2 and S3 respectively. Terminals T4, T5 and T6 are designated for connection to line voltage terminals L2, L3 and L1, respectively, using respective fault contacts FC1, FC2 and FC3.

The overall layout of the control switches and the windings can be described as follows in the illustrated embodiment: the first control switch S1, the first winding W1, and the first fault contact FC1 are connected in series across line voltage terminals L1 and L2; the second control switch S2, the second winding W2, and the second fault contact FC2 are connected in series across line voltage terminals L2 and L3; and the third control switch S3, the third winding W3, and the third fault contact FC3 are connected in series across line voltage terminals L3 and L1. It is essential that the motor terminals T1, T2, T3, T4, T5, T6 be wired with the appropriate control switches S1, S2, S3 and the appropriate fault contacts FC1, FC2, FC3 across the appropriate line voltage terminals L1, L2, L3 to enable the motor controller 12 to perform its motor torque restricting and current limiting functions.

Conventional leads are typically used to connect the delta motor windings W1, W2, W3 to the control switches S1, S2, S3 and to the fault contacts FC1, FC2, FC3. The electrical leads providing connection to the delta motor terminals T1, T2, T3, T4, T5 and T6 are not always clearly marked. As a result wiring mistakes during the installation process of the delta motor system 10 are common.

Figure 3:
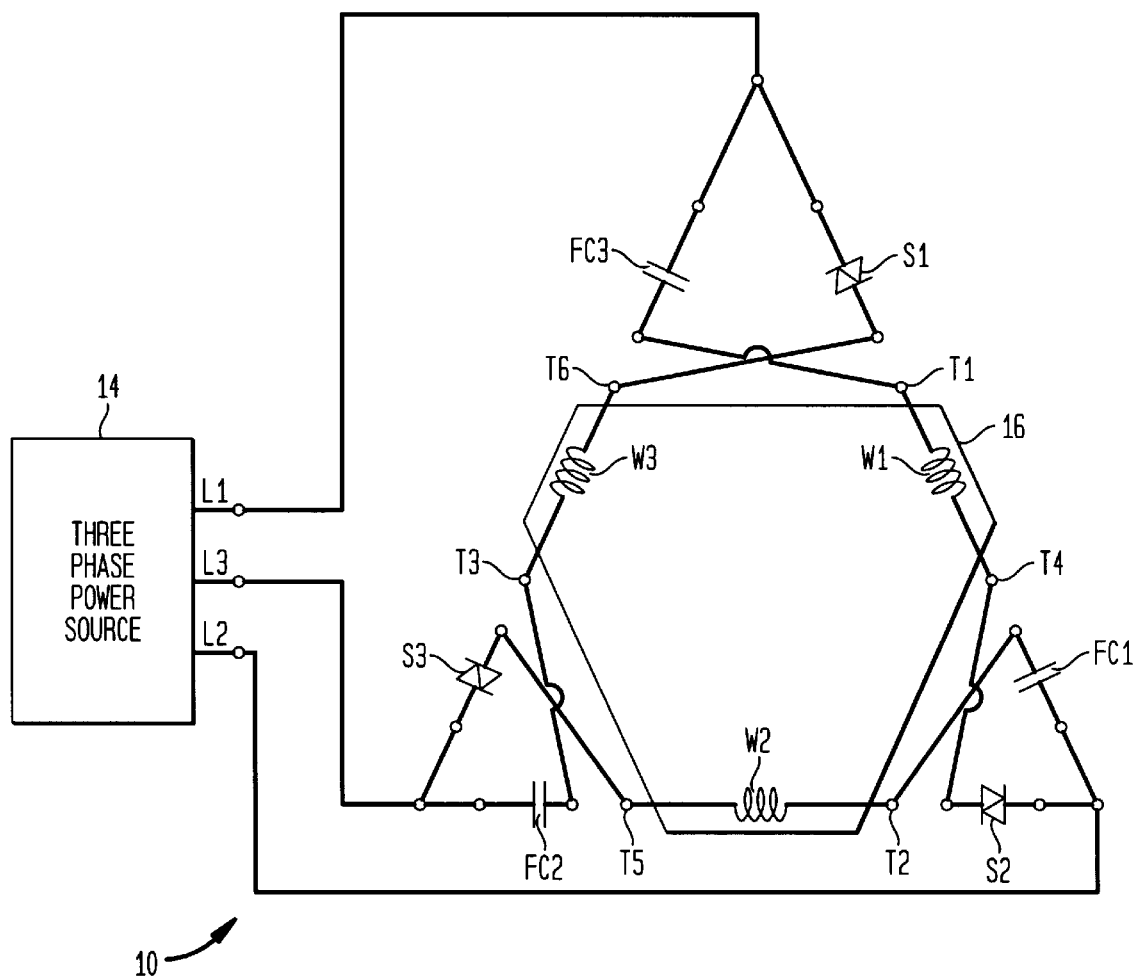
FIG. 3 illustrates the relationships between the delta motor windings, the motor controller control switches and the fault contactor contacts with swapped leads.

FIG. 3 depicts an example of a swapped lead condition where each winding is connected to a different control switch than required. The swapped lead configuration can be described as follows: the first control switch S1, the third winding W3, and the second fault contact FC2 are connected in series across line voltage terminals L3 and L1; the second control switch S2, the first winding W1, and the third fault contact FC3 are connected in series across line voltage terminals L1 and L2; and the third control switch S3, the second winding W2, and the first fault contact FC1 are connected in series across line voltage terminals L2 and L3.

Figure 4:
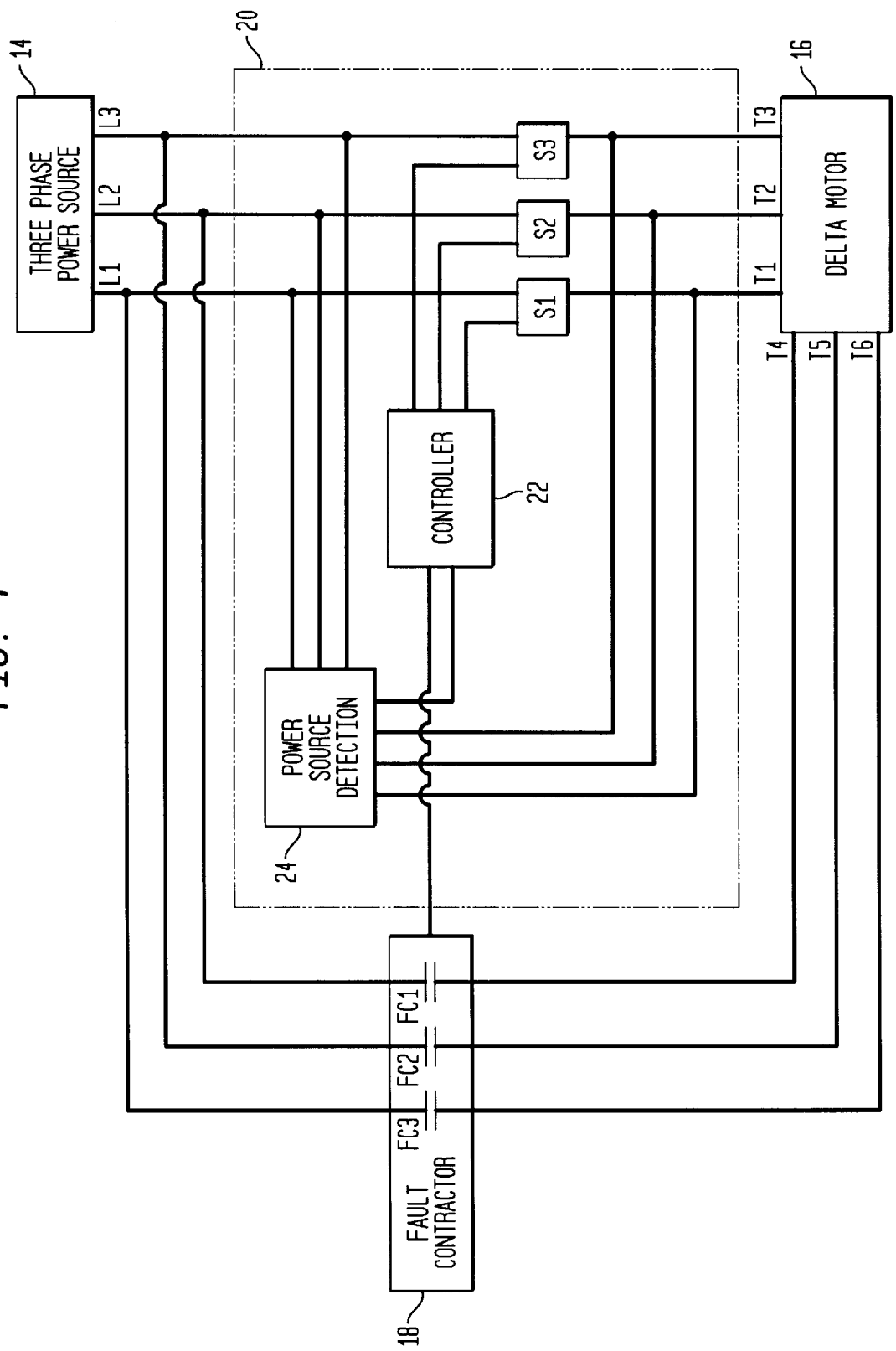
FIG. 4 is a detailed block diagram of the motor controller of FIG. 1.

The motor controller 12 according to the invention, shown in detail in FIG. 4, detects swapped leads and automatically changes firing circuit timing.

A controller 22, connected to each of the control switches S1, S2, S3 and a power source detection block 18, controls the application of voltages from the three phase power source 14 to the delta motor 16 by controlling the operation of the control switches S1, S2, S3. The controller 22 responds to a swapped lead signal generated by the power source detection block 24 by adjusting firing timing of the switches S1, S2, S3 for proper operation of the delta motor 16.

Solid state switches such as SCRs or triacs are used for the control switches S1, S2, S3 in a preferred embodiment of the invention. However, the use of alternative switching mechanisms are also considered to be within the scope of the invention. In addition, in the illustrated embodiment, the controller 22 comprises a programmed micro controller. It should be noted that alternative hardware or software implementations of the controller 22 are also within the spirit of the invention. The power source detection block 24 can be implemented with a logic circuit or using software in the programmed micro controller. The power source detection block 24 is connected across the three switches S1-S3 and accepts the line voltages from the line terminals L1, L2, L3 and the motor winding voltages at the three motor terminals T1, T2, T3 as inputs. The power source detection block 24 compares the line voltages at the terminals L1-L3 relative to one another and relative to the motor voltages at the motor terminals T1-T3, as described more specifically below.

The power source detection block 24 senses signals for the voltages $V_{13}L1$-T, $V_{13}L2$-T2, $V_{13}L3$-T3, $V_{13}L1$-L2, $V_{13}L2$-L3, $V_{13}L3$-L1. When the motor 16 is de-energized (off) and connected to the power source 14 as a first source of power, as in FIG. 2, then all of the following conditions are true:

$V_{13}L1$-T1=$V_{13}L1$-L2;
$V_{13}L2$-T2=$V_{13}L2$-L3; and
$V_{13}L3$-T3=$V_{13}L3$-L1.

The power source detection block 24 decodes the sensed voltages to determine if all of these conditions are true. Under these conditions, the firing circuit timing is referenced from the $V_{13}L1$-L2, $V_{13}L2$-L3, $V_{13}L3$-L1 signals for the respective switches S1, S2, S3.

If the motor 16 is de-energized and connected to the power source 14 as a second source of power, as in the swapped lead condition of FIG. 3, then all of the following conditions are true:

$V_{13}L1$-T1=$V_{13}L3$-L1,
$V_{13}L2$-T2=$V_{13}L1$-L2, and
$V_{13}L3$-T3=$V_{13}L2$-L3.

The power source detection block 24 decodes the sensed voltages to determine if all of these conditions are true. Under these conditions, the firing circuit timing is changed to be referenced from the $V_{13}L3$-L1, $V_{13}L1$-L2, $V_{13}L2$-L3 signals for the respective switches S1, S2, S3.

Figure 5:
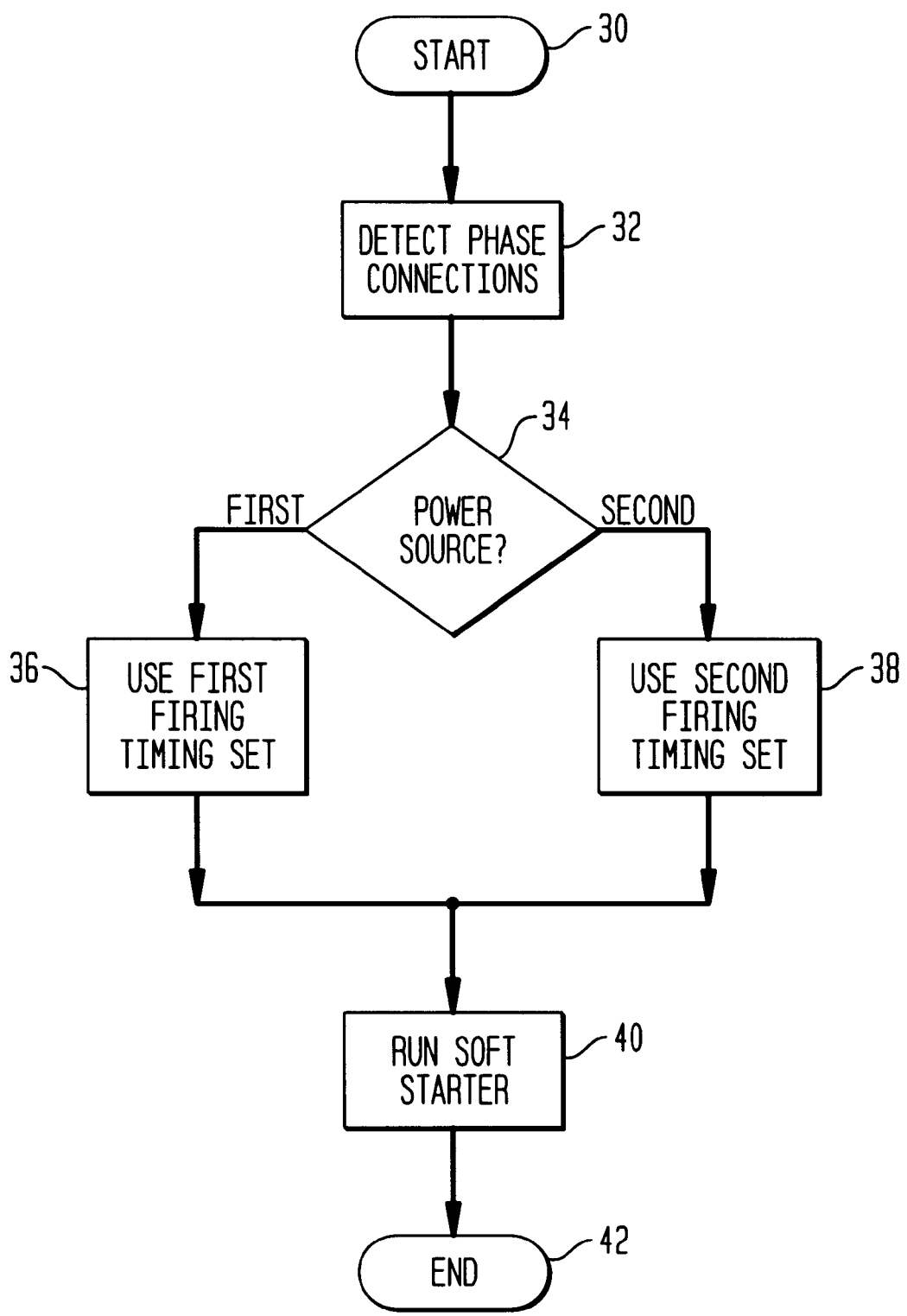
FIG. 5 is a flow diagram illustrating a program implemented in a controller of FIG. 4 for changing firing circuit timing if motor leads are swapped.

Referring to FIG. 5, a flow diagram illustrates a control program implemented in the controller 22 for automatically changing firing circuit timing when motor leads are swapped.

The program begins at a start node 30. The power source phase configuration, as detected in the power source detection block 24, is read at a block 32. A decision block 34 determines if the motor 16 is connected to the power source 14 as a first source of power, as in FIG. 2, or as a second source of power, as in FIG. 3. If the first, then the first set of firing timing parameters is used at a block 36. If the second, then the second set of firing timing parameters is used at a block 38. The soft starter operation is then run at a block 40 and the routine ends at a node 42.

Thus, the motor controller 12 uses the power source detection block 24 to identify if the delta motor system 10 is wired in a swapped lead configuration. Upon detection of this abnormal wiring configuration, the power source detection block 24 generates a signal indicative of the wiring error. The signal is routed to the controller 22 which in turn changes firing circuit timing for proper operation of the delta motor 16.

It will be appreciated that since the entire power source detection process occurs prior to actually turning on the delta motor 16, the delta motor 16 and the motor controller 12 are never exposed to potentially damaging current conditions.

As is apparent, the motor system connections will be modified for the alternative fault contactor connections mentioned above. Nevertheless, the power source detection circuit 24 operates as disclosed herein.

The foregoing disclosure of specific embodiments is intended to be illustrative of the broad concepts comprehended by the invention.

I claim:

1. For use in a motor system including a multiphase power source having three supply lines and a delta motor having three windings, a motor controller comprising:
   a plurality of switching means, each switching means intended to be operatively connected in series with a selected one of the windings between an associated selected pair of the supply lines;
   a power source detecting means operatively connected across each of the switching means to detect if the windings are connected in series with the intended switching means; and
   control means for automatically controlling switching of the switching means dependent on whether the windings are connected in series with the intended switching means, wherein firing circuit timing of the switching means is changed if the windings are not connected in series with the intended switching means.

2. The motor controller according to claim 1, wherein firing circuit timing of the switching means is referenced from a different set of supply line signals if the windings are not connected in series with the intended switching means.

3. The motor controller according to claim 1, wherein the plurality of switching means comprise solid state devices.

4. The motor controller according to claim 1, wherein the plurality of switching means comprise SCRs.

5. The motor controller according to claim 1, wherein the plurality of switching means comprise triacs.

6. For use in a motor system including a multiphase power source having three supply lines and a delta motor having three windings, each winding having an associated first lead and an associated second lead, a motor soft starter comprising:
   a plurality of switches each intended to be operatively connected between a selected one of the supply lines and the first lead of a selected one of the windings;
   a power source detector operatively connected to each of the switches to detect a swapped lead condition if each switch is operatively connected between the selected one of the supply lines and a second lead of a different one of the windings; and
   a controller for automatically controlling switching of the switches dependent on whether each switch is connected to the first lead of the intended winding or the second lead of the different winding, wherein firing circuit timing of the switches is changed dependent on whether each switch is connected to the first lead of the intended winding or the second lead of the different winding.

7. The soft starter according to claim 6, wherein firing circuit timing of the switches is referenced from a different set of supply line signals if each switch is connected with the second lead of the different winding.

8. The soft starter according to claim 7, wherein the power source detects the swapped lead condition if voltage across each switch is equal to voltage between an unintended pair of the supply lines.

9. The soft starter according to claim 6, further comprising a fault contactor having fault contacts connected in series with one of the windings and switches.

10. The soft starter according to claim 6, wherein the plurality of switches comprise solid state devices.

11. The soft starter according to claim 6, wherein the plurality of switches comprise SCRs.

12. The soft starter according to claim 6, wherein the plurality of switches comprise triacs.

13. In a motor system including a multiphase power source having three supply lines, a delta motor having three windings, and a plurality of solid state switches each intended to be operatively connected in series with a selected one of the windings between an associated selected pair of the supply lines, a method of automatically changing switch firing, comprising the steps of:
   detecting if the windings are connected in series with the intended switching means; and
   automatically controlling switching of the switching means dependent on whether the windings are connected in series with the intended switching means, wherein firing circuit timing of the switching means is changed if the windings are not connected in series with the intended switching means.

14. The method of claim 13, wherein firing circuit timing for controlling switching of the switches is referenced from a different set of supply line signals if the windings are not connected in series with the intended switching means.

* * * * *